COLOR TELEVISION APPARATUS
Filed July 7, 1945
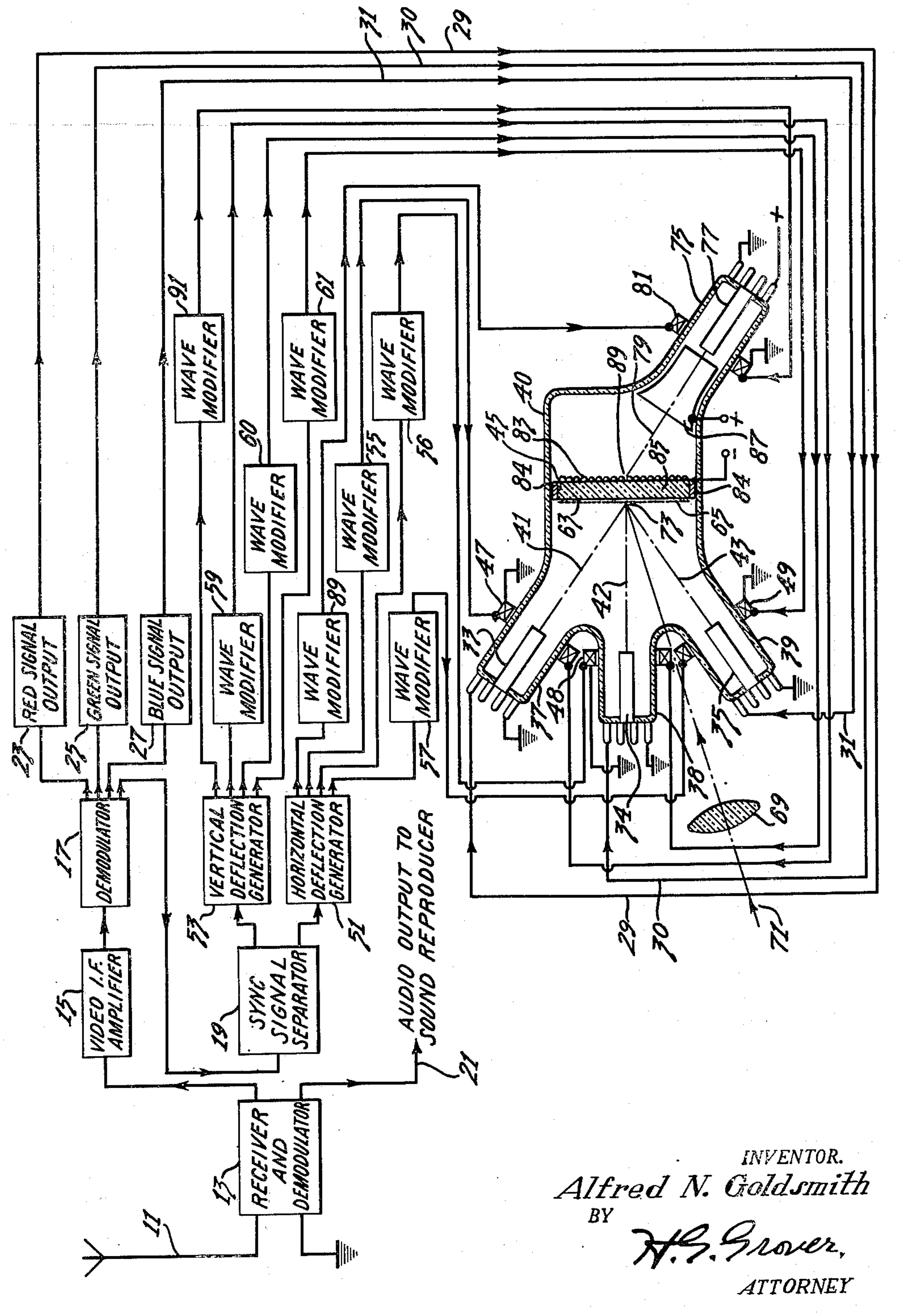
INVENTOR.
Alfred N. Goldsmith
BY H. G. Grover,
ATTORNEY Patented July 25, 1950 2,516,314

UNITED STATES PATENT OFFICE 2,516,314

COLOR TELEVISION APPARATUS

Alfred N. Goldsmith, New York, N. Y., assignor to Radio Corporation of America, New York, N. Y., a corporation of Delaware Application July 7, 1945, Serial No. 603,686

18 Claims. (Cl. 178—5.4)

This invention relates to electronic apparatus and equipment suitable for use in connection with electronic switching operations, television operations, and the like. For the purpose of describing the broad features of this invention, its application to the field of television, with particular emphasis on color operations, will be set forth herein.

Broadly speaking, the invention, as applied to color television operations, is for the purpose of insuring the simultaneous accurate and substantially precise registration of a plurality or multiplicity of approximately homologously scanned rasters or image areas. The apparatus and method, herein to be set forth, involves, generally speaking, the cooperative use of a controlling electron scanning beam which is caused to trace a scanning raster and, in doing so, to cause or to induce certain electrostatic charges in the general region at which other electronic scanning beams instantaneously impact a suitable target area. The general effect thus brought about is a substantial coalescence of the instantaneous individual impact points of a multiplicity of controlled electron beams so that substantially precise registry of all such controlled beams is produced throughout any desired path or scanning raster.

In color television operations, which is one form of use to which this invention finds particular application, it is generally considered desirable so to plan operations that the ultimate practical reliable form of operation would involve an electronic system of the additive type wherein a multiplicity of component color images, with or without a separate key or neutral tinted image, are simultaneously developed or transmitted as a result of a scanning operation. Systems of the additive type are preferred over the subtractive methods in television operations, generally speaking, because the most readily available television scanning methods in the present state of the art do not generally, by their very nature, lead to effective and practical subtractive process arrangements.

Further, it has been found that for color television operations, tricolor or quadricolor methods are to be preferred, along with key image renditions, where desirable, because they alone now appear capable of producing the final electro-optical effects within a proper and reasonably accurate color range of colors which is required. Likewise, simultaneous operations in a multiplicity of color renditions are generally to be desired because of the marked improvement in reduction of color flicker and because such systems inherently avoid color action fringes. Also, electronic methods for effecting these objectives are preferred because of the complete absence of moving parts, motors, elements having considerable mechanical inertia, vibrating of acoustical motor devices, elements which are capable of producing inductive electrical disturbances, and the like.

So far as is known, the systems of the prior art which proposed simultaneous multicolor electronic operation presented a major and substantial difficulty in that precise and accurate initial registration was required for each scanning process or line in the traced image raster, and because it was found that even initial registry is not usually sufficient to insure that registration will be retained throughout the complete image raster representing each component color in view of diverse deviations from deflection linearity in the component color images. Circuit and power supply variations may similarly affect accuracy of registration at later times. In any event the permissible variations from strictly identical scanning within any individual raster would be but a minor fraction of the size of a scanning spot. Accordingly, the problem of image representation becomes difficult and the prior art systems generally have sought to solve a problem of this character through the use of auxiliary control systems which would insure complete linearity of the scanning trace through the use of correcting systems or networks of the type which has been shown by this applicant in his United States Patent No. 2,367,116, granted January 9, 1945, or where size control of the traced image raster at its boundary areas has been effected by the use of so-called "probe" elements into which the scanned raster beam is traced.

Further, in multicolor systems of the electronic type using a single image producing tube or a single camera tube only, provisions have been made, as shown by this applicant, for scanning a target area by a plurality of electron beams impacting it along paths which originate at spacially separated points relative to the target. A system of this character thus required the use of certain correcting circuits which would modify or otherwise change the beam position by varying its deflection from time to time as the target was traced. Correcting systems of this general character have been disclosed by the present applicant in his co-pending applications for United States Letters Patent, Serial Nos. 548,238, now Patent No. 2,481,839; and 548,240, now Patent No. 2,431,115 each filed August 5, 1944. Certain references to the above-mentioned copending applications will be made in what is to follow in that the types of deflections herein utilized may follow those suggested by the said copending applications.

In its essence, the present invention is based upon a means and method of drawing together electronically the slightly separated scanning spots which are quasi-homologously and simultaneously produced for developing or scanning the individual component color images. This effect is brought about by controlling the individual scannings of the electron beams over a target area by the use or development of a positive electrostatic charge of small spacial distribution which is caused to move over a partially conductive surface which is close to and generally parallel to, but insulated from, the surface or surfaces upon which the component color scanning beams are arranged to impact for the control of the separate (usually simultaneous) and quasi-homologous scannings.

Such a control charge might, for convenience, be termed a "registration control spot" or merely a "control spot.". A spot of this character might theoretically be producible by means of a positive ion stream which is caused to impact the partially conductive surface above mentioned. The positive ion stream would then be deflected, for example, homologously with the approximate average of the quasi-homologously operating component color scanning beams. However, in that it is difficult to produce and control rapidly and widely an ion beam, such as might be used for this purpose, it is generally preferred that the control spot should come into being through the action of the better known and usual form of an intense cathode ray scanning beam.

A cathode ray scanning beam of a type herein disclosed is caused to pass over a partially conductive surface, which might be generally regarded as being of mosaic or any physically equivalent type, which is arranged close to and parallel to but insulated from a surface of lateral conductivity upon which the scanning beams to be registered are initially arranged to impact. This first-mentioned intense electron scanning beam may be termed, for convenience, a "mentor beam" since it serves to bring about the continuous and accurate or substantially precise registration of each component color image. To accomplish this result the mentor beam brings about the creation of electrostatic charges which are induced on the target area at its point of impact or because of its moving through a closed volume of dimensions which are small relative to those of the target but which contain in an area of the target the scanning spot of the beam or beams to be registered. The surface or element toward which the mentor beam is directed may, for convenience of reference, be generally regarded as the mentor surface. The mentor beam is then arranged to be deflected in bidimensional manner to trace a raster on the mentor surface which is of approximately like size and homologous to the rasters traced by each of the first component color scanning beams. The mentor beam and the scanning beams thus impact their respective targets at fairly closely adjacent points. To this end, the deflection controls and their polarities for the scanning beams and the mentor beam must be appropriate in magnitude and sign. In this way, any charges brought into being by virtue of the mentor beam being caused to move in predetermined paths relative to the mentor surface will provide an additional or an auxiliary control adequate to obtain registration of all of the initial component color scanning beams. Such charges will suitably modify the final portions of the scanning beam paths close to their impacts on the target surface, and will thus bring the impact points into registry.

In the light of the foregoing, it will be appreciated that this particular example of the invention thus has as its aims, purposes and objectives, those of producing additive multicolor simultaneous electronic television operations. The more general purpose of the invention is to cause the accurate placement of the impact points of one or more scanning beams in accordance with the control exercised by one or more mentor beams. It also serves to provide for the continuous and accurate registration of all of the component color images in a process of the above-named character. Then, the invention goes further in that it provides for the initiation and the maintenance of such accuracy of registration alone or in combination and cooperation with the use of other methods of image registration already known and utilized. Next, the invention is intended to initiate and maintain such accurate and intra-image registration despite slight variances in the individual component color image scanning operations as might be brought about by fluctuations in the power supply, tube heating, circuit variations and the like, as well as despite mechanical imperfections. Next, the invention in this particular exemplification will serve to provide for maintaining such registration accuracy of all component color images when it is used with or without a key image. Still further, this invention is intended to provide a system for obtaining the registration of a plurality of individually acting control beams in such a way that its effectiveness is maintained irrespective of the displacement or deflection of any or all of the control beams from a normal undeflected path relative to a target area. The invention also aims to overcome in a novel and efficient manner defects of the prior art which have substantially prevented the production of accurately positioned individual component color images, when used either for simultaneous or sequential color operations. Then, in addition, this invention seeks to provide a system of color television operations, for instance, which is highly efficient in its use; a system which is substantially free from errors or defects in its operations by unskilled persons; a system which will bring to a sooner realization high quality, high definition color television operations; as well as a system which can be incorporated with known forms of television control circuits.

The invention, in one of its preferred forms which is particularly useful for television operations, has been illustrated by the accompanying drawings; wherein, The single figure shows one form which the invention may assume, by way of example.

Referring now to the drawing, the video or image signals corresponding to the various component color images which have resulted from suitable scanning operations at a transmitting point are adapted to be received (along with accompanying control or sync signals and often the related sound) by means of any sort of a communication channel such as wire line, particularly in the form of a coaxial cable, or by the transmission of carrier-modulated signals through any medium or free space. In the latter form of system, the signal energy, as received, is picked up by any suitable form of receiving antenna instrumentality such as that conventionally represented at 11. In this connection, it should be understood that the receiving antenna is usually in the form of a dipole or the like, with or without reflectors. The antenna arrangement, however, forms no specific part of this invention, and the illustration is, therefore, purely schematic.

The received signals are then supplied to a suitable receiver and demodulator unit 13, such as is well known in the art, where they are converted into intermediate frequency signals. Usually, the video signal modulation, together with any and all synchronizing information, is transmitted as a modulation of one suitable carrier frequency, while the accompanying sound signals are caused to modulate a second carrier frequency ordinarily spaced at a fixed frequency separation from the video carrier. In present-day operations, the video signal modulation is provided as an amplitude modulation of the video carrier and the sound modulation is provided as a frequency modulation of the audio carrier. The system herein to be described will be considered as embodying technique of this nature, although it should be borne in mind that the general type of receiver instrumentality exemplified by the showing of this application is applicable whether the various signal modulations occur as stated or whether the video signal modulation is also transmitted as a frequency modulation of the video carrier, or even as a phase modulation thereof or any combination of these various forms of modulation. Any suitable form of frequency modulation, amplitude modulation, or a phase modulation receiver may be utilized for converting the sound modulation signals into audible outputs, depending, of course, upon the type of transmitter modulation.

In the exemplification of the invention, as depicted in the drawing, some intermediate frequency amplification may be considered, where desired, as being provided in the receiver and demodulator unit, it being understood, of course, the video signal modulation, together with the control signals, are amplified at one intermediate frequency, while the sound modulation signals are amplified at a different intermediate frequency range spaced from the video intermediate frequencies by a frequency variance corresponding to the separation of the video and audio carriers.

Further video signal amplification may be provided in the video intermediate frequency amplifier 15. This unit may be of any desired form or type such as those heretofore already proposed and used in the art. One such form of amplifier is shown by Grundmann Patent No. 2,300,501, granted November 3, 1942. Similarly, such amplifiers are also found exemplified, for instance, in such well-known texts as "Principles of Television Engineering," by D. G. Fink, published by McGraw-Hill Book Company, New York, in 1940, to which text reference may also be made for such other conventionally represented units as are represented by the drawing.

After suitable amplification and detection in the units 15 and 17 respectively, the synchronizing signals (commonly termed "sync" signals, which term is hereinafter used) are separated from the video signals by well-known forms of sync signal separators conventionally represented at 13. Likewise, the audio signal output from the receiver and demodulator unit 13 is represented at 21. It is intended that this connection 21 shall be made to suitable additional intermediate frequency amplifiers and detectors and sound amplifiers (not shown) to actuate suitable sound reproducing apparatus (also not shown).

After the video intermediate frequency signals have been suitably amplified in the unit 15, they are preferably supplied to the demodulator 17, as above suggested, and from there are fed or supplied to signal amplifier units 23, 25 and 27 which may be regarded, for instance, as suitable for use to amplify the red, green and blue color component video signals, respectively.

In the scanning operations which occurred at the transmitter point, as was suggested, for instance, by applicant's copending applications above referred to, and as also may be inferred from a consideration of applicant's further copending U. S. applications, Serial No. 455,556, filed August 21, 1942, now Patent No. 2,423,769, Serial No. 558,357, filed October 12, 1944, and Serial No. 585,061, filed April 7, 1945, now Patent No. 2,475,333, it is possible to arrange the transmission of the signals representing the separate component color images such as the red, green, and blue in such a way that they modulate separate subcarriers and the group, in turn, modulates the main video carrier. In this way, the demodulation of the signals usually would not occur until subsequent to the separation in the units 23, 25 and 27. The component color separation units 23, 25 and 27 preferably include at their input suitable band pass selectors to segregate the red, the green, and the blue input signals one from the other. Amplification is arranged to take place in most instances in these units. The separate video signal outputs may then be suitably detected in demodulator units connected intermediate the units 23, 25 and 27, and the controlled image producing tube, which is arranged to convert the received and demodulated signals (usually after further video amplification—not shown) into the visual image points.

The foregoing explanation is particularly applicable to systems wherein the color image signals, representative of all three images, are simultaneously transmitted. If, however, sequential transmission of the various color component images is to be desired, it then is usually not necessary to provide the separate subcarrier modulations at the transmitter but rather the transmitter carrier frequency is modulated in sequence by the separate image signals representing the different component colors into which the optical images have been analyzed.

For this form of transmission, provisions are made for keying the red signal output unit 23, the green signal output unit 25, and the blue signal output unit 27 in sequence by means of a suitable commutating or electronic switching arrangement of a type which is well known in the art and which might be exemplified, for instance, by the arrangement set forth in U. S. Patent No. 2,146,862, granted to C. C. Shumard, on February 14, 1939, or the Roys and Mayer U. S. Patent No. 2,089,430, granted on August 10, 1937. For this type of operation, the commutator arrangement of Shumard or Roys and Mayer would be arranged to connect the red signal amplifier 23, the green signal amplifier 25 or the blue signal amplifier 27 in sequence with the output of the demodulator 21, and the sequence then would be controlled by the triggering of the electronic commutator arrangements of Roys and Mayer or Shumard preferably under the influence of the field (vertical) synchronizing or sync impulses. This portion of the arrangement and system is not per se one of the claimed forms of this invention, and hence the schematic reference and illustration thereof.

The output from the various signal output amplifiers and the component color image signals, whether they result from simultaneous transmission of the various component color video signals or the sequential transmission thereof, are supplied by way of suitable output conductors 29, 30 and 31, respectively, to bring about the modulation of the control electrode (not shown) of the electron gun elements 33, 34 and 35, respectively, contained within the necks 37, 38 and 39 of an image producing tube, conventionally represented as a whole, by the numeral 40.

The scanning cathode ray or electron beams, which are represented by the dot-dash lines 41, 42 and 43, issue from the electron guns 33, 34 and 35. The electron beams 41, 42 and 43 are directed to impinge upon a target electrode or element conventionally represented in its totality at 45, and which will be referred to later in more detail. At the moment, it may be assumed that each of the electron beams 41, 42 and 43 is signal modulated by one component color signal and strikes the target 45 in such a way that the beam brings about a visual effect at the target area which represents instantaneously the color and luminous intensity of that point in the image raster at which the beam impacts the target area.

Suitable deflecting yokes 47, 48 and 49 are arranged to surround the neck portions of the tube so as to bring about a bidimensional deflection of each electron beam so that the beams all tend to trace like pattern rasters on the target area 45. The specific form of the deflecting yokes is not per se a part of this invention and, therefore, it may be considered that the magnetic form of deflection is illustrated purely by way of example, and each yoke will be understood to comprise suitable electromagnetic coils serving to bring about a deflection of each electron beam along a line scanning path (usually considered the horizontal deflection) and along a field scanning path (usually regarded as the vertical deflection). The deflections are controlled under the influence of the sync signals which are separated out, as above noted, from the combined video, audio, and sync or other control signals which were received and amplified in the amplifier 15 and the demodulator unit 17.

The sync signals which are separated out from the combined signals in known manner by the sync signal separator 19 are arranged, as in normal television receiver operations, to control the operation of a suitable horizontal deflection generator 51 and a vertical deflection generator 53, it being understood in this connection, that as used herein, horizontal will refer to the line deflection whether this be actually horizontal or vertical, and vertical deflection will be termed the deflection to provide the field or frame scanning pattern which follows a predetermined number of individual horizontal or line scanning traces and which is usually a deflection that occurs in a direction normal to the line or horizontal deflection. The control of the horizontal deflection generator 51 and the vertical deflection generator 53 may be assumed to become effective by reason of the different character of line and field sync signals that have been adopted, and, to this end, reference may again be made to the above-mentioned text, "Principles of Television Engineering," and to the form of synchronizing signals shown therein and exemplified, for instance, on page 161. Usually, the horizontal deflection generator is controlled from a separator wherein the high pass filter or differentiator type of input circuit is provided. The vertical or field deflection generator is controlled from an input circuit usually in the form of a low pass filter or integrator circuit which separates the long duration (usually slotted) vertical sync pulse from the short duration horizontal sync pulse. This practice is well known in the art and need not be illustrated or described herein in any further detail.

In the case of the tube utilized to produce component color images and, particularly, where the different component color scanning beams emanate from tube portions or necks or electron guns located each at an angle away from normal from the surface or target upon which the several scanning beams are adapted to impinge and each located at a selected angular separation from each other, it is apparent that without correction of the normally developed sawtooth wave for bringing about deflection, the various electron beams would fail to register except at the centralmost portion of the scanned pattern. While not intended as limiting it may be assumed that the electron guns 33 and 35 are suitably spaced from each other and that the gun 34 is spaced equi-angularly from each of the first named guns, and then, that all guns direct an undeflected electron beam along separate paths each approximately 45° to the normal to the target element 45. Such an arrangement is but one of many that are possible but it will be apparent that so arranged the problem of correcting distortion becomes easier and also if a key image is produced the control beam therefore can be developed from an electron gun which is spaced from gun 34, for instance, and also equi-angularly spaced from each of guns 33 and 35 for the assumed condition.

It was explained in detail in my copending application Serial No. 548,238, now Patent No. 2,481,839, filed August 5, 1944, particularly, that the different scanning beams directed toward a target area from positions, such as those indicated by the drawing, would trace different shaped patterns on the target in the absence of correction and alteration of that pattern. For instance, one scanning beam would trace a trapezium shaped pattern with the long dimension toward one edge of the target and the short dimension toward the other edge of the target. Another scanning beam would substantially reverse this pattern and the third scanning beam would trace still a different form of pattern. The result is that in the absence of correction, the various line traces of the target area or the produced rasters from each scanning beam would in no may coincide. Where coincidence of all points on each traced raster is lacking, it will be apparent that it would be impossible to bring about registry of what are intended to be homologously positioned points in the raster traced by each separate scanning beam. Consequently, provision is made herein also for deliberately distorting slightly the normally produced sawtooth deflection wave developed by the separate horizontal and vertical deflection coils located within the various yoke elements such as the yoke 47, for instance. This effect is brought about by injecting more or less of an influence of the vertical deflection in the horizontal deflection in accordance with the actual instantaneous vertical deflection and by inter-locking the various deflections one with another, as was indicated in the said last-mentioned application.

For the purpose of describing this invention, it may be understood that the deflecting field instantaneously active on each electron beam 41, 42 or 43 is modified in accordance with its instantaneous position of impact on the target area 45 in such a way that homologous points in the rasters traced by each scanning beam are brought into approximate registry at the target area 45. This effect is brought about through the introduction of suitable wave modifier circuits such as those particularly described in the mentioned applications, with special reference being given to application Serial No. 548,238, now Patent No. 2,481,839. The wave shapers or wave modifiers are thus herein designated as 55, 56 and 57 for modifying the line deflection trace of the scanning beams 41, 42 and 43, respectively. Similarly, the wave shapers or wave modifiers 59, 60 and 61 are provided in the vertical deflection control circuits for modifying the deflection brought about by the vertical deflection generator 53 in such a way that the wave modifiers 59, 60 and 61, respectively, control or modify similarly the vertical deflections of the scanning beams 41, 42 and 43.

In the foregoing description, it should be appreciated that this correction provided by the wave shapers or wave modifiers brings about an approximate registry instantaneously of the various scanning beams at a point 73 on the target 45 to represent one instantaneously scanned elemental area which is homologous for each of the assumed component color scannings. The reference herein to approximate registration is intended to convey the thought that this brings about generally a workable and reasonably fair registration of the separate scanning beams but not that further enhanced degree of registration which is highly desirable for high fidelity color image production where it is essential that substantially precise registry of each color image point be maintained at all times so as to avoid the effects of color fringes and the like. Any reference herein to substantial registry will, accordingly, be understood as defining a considerably closer degree of registration than the above used term of approximate registration. For the purpose of these considerations, it will be understood that substantial registry will imply the effect of precise registration so that a substantial complete overlay of the various component color images will always result rather than a fair approximation thereto.

The form of target element represented conventionally by the designation 45 may vary within wide limits and to all intents and purposes the face of such a target which is turned toward the electron beam sources may comprise a series of elements of pyramidal or tetrahedral form, such as those described and referred to in my mentioned copending application Serial No. 548,238. When the target area is formed of such pyramidal or tetrahedral elements, it will be appreciated the faces of such elements are of sub-elemental size, and the separate faces are coated with luminescent compounds to respond in one color only, and the electron beams impact the target area in such a way that each beam reaches related pyramidal faces which luminesce in some one color only.

The target surface upon which the several scanning beams 41, 42 and 43 impact may also consist of separate areas adapted to luminesce in different component colors with an electron impermeable and systematically perforated masking element arranged relatively close to the target area but between it and the beam sources so as to shield the target area from the impact of scanning beams which would otherwise reach luminescent particles to bring about luminescence in colors other than that represented by the beam modulation. Further, in another and alternative embodiment, the target area may be formed in strips of different forms of luminescent materials, with each strip width, for instance, being but a fractional part of an image point or scanning element width. A form of target area of this character is exemplified by my above-mentioned copending application Serial No. 548,240, now Patent No. 2,431,115.

While it is proposed, merely by way of example, this invention may be considered to comprise a target surface formed wherein luminescent materials of different color responses constitute the coating the surface element, such as 63, of the target electrode 45 and wherein an electron impermeable and systematically perforated masking element 65 is interposed between the coated face 63 and each electron beam source, for instance, for the purposes hereinabove mentioned.

The several cathode ray scanning beams 41, 42 and 43 may be considered as being directed toward the target 45 so as normally to pass through like perforations in the electron impermeable area of the masking element 65. Where the luminescent coating on the face 63 of the target is applied, as disclosed in my last-mentioned copending application, it will be apparent that in view of the origin point from which the scanning beam 41 is directed, for instance, this beam will fall upon say red responsive areas only of the coating materials 63. The scanning beam 42 is directed toward the target area in such a way that it is able to reach say green responsive areas only of the coated material 63 when it passes through the perforations in the electron impermeable area of the masking element 65. Similarly, the scanning beam 43 becomes effective only upon say blue responsive luminescent particles. Solely for purposes of illustration, the coatings of luminescent material on the coated surface 63 which respond to produce red light may be regarded as chromium-activated aluminum beryllate or zinc cadmium sulfide activated by silver. It is possible to use alpha-willemite activated with manganese and zinc cadmium sulfide activated with silver to produce green luminescence, and silver-activated zinc sulfide, zinc silicate and zirconium silicate may be used to produce the blue luminescent effects. These compounds are suggested merely by way of example and have already been set forth by the Leverenz U. S. Patent No. 2,310,863, which was granted February 9, 1943.

For many conditions of operation of the system and device herein explained, it is desirable that a conducting layer be placed immediately beneath the coated surface 63 to cover the support surface for the luminescent material. Such a conducting surface may frequently be in the form of a very thin layer of silver particles or the like. In many instances, the layer can provide adequate transverse conductivity and still be sufficiently thin as to be of semi-transparent character or it may even have a greater degree of transparency. The purpose of such conducting or semi-conducting coating will appear in what is to follow.

If now the deflecting fields, which in the illustrated example are electromagnetically brought about by reason of the currents flowing through the deflecting yokes 47, 48 and 49, are such that each of the scanning beams 41, 42 and 43 traverses a like raster on the target element 45, it will be apparent that the component color image productions will be brought about.

It should be understood, of course, that adequate shielding (not shown) should usually be provided between the deflecting yokes so as to prevent influence of one upon the other. Likewise, while also not shown for reason of simplicity, the various scanning beams 41, 42 and 43 are assumed to be directed through suitable focusing fields produced electrostatically or electromagnetically so as to bring them into focus substantially at the target area. Under these circumstances, the resultant images which are caused to appear upon the target area 45 may be viewed through a conventionally represented optical system 69 when the target area is viewed along the path generally represented by the dot-dash line 71 from the direction shown by the arrows. It should be understood that this direction of viewing is actually substantially normal to the plane of the target, notwithstanding the conventional form of illustration provided for clarity of showing, in view of the fact that the three separate scanning beams have been depicted as in such positions as will leave a clear normal viewing area in the tube 40. It is, of course, also possible to view the target area from the reverse side in a manner which is at once apparent.

Regardless of how careful the design and construction of a system of the character hereinabove set forth it usually is not possible to bring each of the scanning beams exactly or precisely into registry at the desired point of impact on the target area, which point might be conventionally represented herein as 73 where all of the scanning beams are seen to merge or effectively coalesce.

It was above mentioned that substantially precise registry of the various scanning beams 41, 42 and 43 could not readily be brought about under the influence of the separate deflection control such as shown, even though it was possible approximately to register each of the separate beams at the target area. Unless there is substantially a precise registry of the beams so that the color responses produced by each are able substantially to coalesce at each point in the produced image, color fringes at the edges of objects and generally washed-out color representations, as well as color flicker at edges, generally come into being as a result of the scanning operation.

This present invention provides an auxiliary or supplemental color registry correction of such a nature that an electrostatic charge, for instance, is developed at or near points on the target area where it is intended the several scanning beams shall instantaneously impinge. This objective is achieved by providing at the opposite end of the tube 40 a supplemental neck portion 75 in which there is an electron gun 77 arranged to release an electron scanning cathode ray beam 79. This beam 79 is the above-mentioned mentor beam. A suitable deflecting yoke for providing the bidirectional deflection of the scanning cathode ray beam 79 is arranged to surround the neck 75 of the tube. The resultant beam 79, for reference purposes herein, will, as stated, be termed a control beam or a mentor beam. This resultant beam 79 is then directed toward the surface 83 of the target element 45 so that it produces thereat an electrostatic charge which travels across the surface in a pattern coinciding with the raster traced by the scanning beam 79 under the influence of the electromagnetic fields developed in vertical and horizontal directions by reason of the deflecting voltages applied to the yoke 81, and, accordingly, converts the surface area 83 into a control surface which is close to and parallel to the surface 63 but which is insulated therefrom by means of an insulating sheet or layer conventionally represented at 85. The insulating sheet 85 is preferably formed of glass, mica, certain plastics or the like, which are substantially transparent to light so that, if desired, the luminescent effects which are produced in the surface area 63 may be viewed from the side at which the control mentor beam 79 impacts the target 45. The insulating sheet 85 is usually so designed that it has certain conductivity across it. This permits charges developed by the mentor beam 79 to leak through the dielectric to a grounded or oppositely charged electrode within a desired time cycle. The time for disappearance of the charge at any point of 83 is usually very short and corresponds (preferably) to the time required to trace but one of a very few image points on the surfaces 63 or 83.

The glass insulating sheet 65, above mentioned, thus may be a lead glass or it may even have graphite mixed in the glass or other dielectric, especially in the case where the produced images are viewed from that side of the target whereupon the controlled scanning beams 41, 42 and 43 impinge.

The target surface 83 is preferably metallic in nature and such that it is capable of releasing a considerable number of secondary electrons for each primary electron projected thereupon. Various elements such as are well known in the art may be utilized for this purpose, with the secondary emission ratio frequently running as high as 10, or even greater. Surfaces of this character are well known in electron multipliers and frequently include selected proportions of some of the photoelectrically responsive elements, such as caesium, for instance.

The target element 83 is, however, preferably made of material having relatively low transverse conductivity, or, in other words, its lateral resistivity is relatively high, in order that any charges which are created upon the surface will not be dissipated immediately but rather, will endure or persist for a selected time period and yet can be dissipated by conductivity across the surface or through the dielectric or both to a supporting electrode element 84. The electrode element 84 is arranged as a peripheral electrode surrounding completely the edge or border areas of the target area 45 and is in electrically conductive relationship with the coating 83 on this target element. The electrode so arranged also thus provides the effect of a shielding element within the tube. Also, as will later be pointed out, the peripheral electrode 85 connects with the negative terminal of a suitable voltage source and it provides a conductive path from all points on the target area toward the nearest edge portion thereof. Such conductive paths constitute leakage paths across the material coating 83.

With the surface 83 being formed as a material from which a considerable number of secondary electrons are released for each arriving primary electron, it will be apparent and appreciated that the intense and relatively high velocity cathode ray mentor scanning beam 79 releases a considerable number of electrons at the instantaneous point of impact from the surface 83, which surface is supported upon a dielectric element 85. The released secondary electrons are dependent in magnitude upon the velocity of impact of the beam 79, its intensity and other factors which are not necessary here to consider. The released secondary electrons are readily picked up by the collecting electrode 87 connected to a suitable source of positive voltage and arranged to surround at least a portion of the neck 75 of the tube section in which the mentor beam is developed. The release of secondary electrons from the surface 83 creates positive charges at each point of electron release, which charges are of magnitudes proportional to the secondary emission and which occur at each point of instantaneous impact of the mentor beam 79.

These charges thus created tend to draw slowly moving electrons toward the point where the charge is created. In addition, a localized increase in potential appears across the insulating or dielectric element at a point opposite the assumed point of mentor beam impact, represented at 89, for instance. The created potential which is represented by the produced charges is caused effectively to add to the voltage gradient through which the signal modulated electron beams 41, 42 and 43 are permitted to fall in their passage between the respective electron guns and the target surface 63 whereupon the luminescent coating is provided. The result is that the increase in positive voltage due to the charges developed under control of the mentor beam 79 is sufficient to provide a modification in the terminating directional path along which the modulated electron beams 41, 42 and 43 travel in the area very closely adjacent the luminescent material coated target so that instead of providing the approximate registration of all of these controlled cathode ray scanning beams, the additional positive charge brings about such supplemental bending of all of the beams 41, 42 and 43 that they are all brought to substantially precise registry at a point on the surface 63 which is directly opposite the point 89 where it is assumed the mentor beam instantaneously reaches the surface 83. Thus, with all of the beams 41, 42 and 43 being supplementally controlled by the mentor beam in such a way as to bring them into substantially precise registry, the resulting color effects produced thereby will represent a substantial coalescence of all of the color values and bring about an accurate image representation.

It was above mentioned that the dielectric material 85 might be of such a character that a certain predetermined conductivity therethrough was permitted. It will be appreciated that if such conductivity is provided and if a conducting layer is supported on the dielectric material 85 and arranged, in turn, to support the luminescent material, such charges as have been built up across the dielectric to exercise a supplemental or auxiliary control on the signal modulated beams can rapidly be dissipated by leakage through the dielectric. The same charges are also dissipated to some extent, as above mentioned also, by reason of the conductivity of the multiplicity of parallel paths between any point of impact of the mentor beam 79 and the peripheral conductor or ring 84. Conductor 84 also contacts the slightly conductive dielectric 85 so as to provide a source of neutralizing electrons therethrough. In this connection, it should be understood that there is also an electrical connection between the conducting layer (not shown) supporting the luminescent material and the negative terminal of some suitable voltage source or a direct connection to ground. Such leakage as occurs across the conductive surface 83 of the target 45 is assisted in accordance with the negative potential applied to the peripheral electrode element 84.

It, accordingly, becomes evident that the leakage of the charge built up at each point on the target 45 which is impacted by the mentor beam will rapidly leak away after it has served its intended function of registering the various scanning beams 41, 42 and 43 at some common point 73, for instance. The rate of leakage of such charge becomes a function of the surface leakage on the surface 83 due to the coating in the plane of impact of the mentor beam, a function of the dielectric leakage through the dielectric or insulator 85, as well as a function of the negative potential applied to the peripheral electrode, or, at times, it becomes a function of all of such conditions.

Since the modulated or controlled scanning beams 41, 42 and 43 which were to depict the various component color representations of the image are continually tracing a raster of predetermined character, it should be understood that the scanning beam or mentor beam 79 should also trace an homologous raster if the mentor beam is continually to assert a supplemental or controlling effect on the signal modulated cathode ray beams. Thus, deflecting wave energy for bringing about both horizontal or line and vertical or field deflection of the mentor beam 79 is applied to the deflecting yoke 81 from the horizontal deflection generator 51 and the vertical deflection generator 53. The deflecting wave energy so supplied to the yoke 81, and its coils, is usually fed through a wave modifier unit 89 for correcting the horizontal deflection wave and through the wave modifier unit 91 for correcting the vertical deflection wave.

These wave modifier units 89 and 91 are again represented schematically, but it is to be understood that they are of the general form shown by copending application Serial No. 548,238 and also are of the general known forms to provide rectangularity of the traced raster on the face 89 of the target element 45. Such arrangements are any of the well-known forms to provide keystone correction and are such that the horizontal deflection wave is modified in accordance with the vertical deflection wave and, if necessary, the vertical deflection wave is modified in such a way that linear transverse deflection is continually brought about.

There is a direct relationship between the traced pattern of the target area provided by all of the electron beams, it being understood, of course, that if the controlled or modulated scanning beams 41, 42 and 43 trace the target area from left to right, as is usually the case, the mentor beam 79 will trace the opposite side of the target in a direction from right to left. In this way, the horizontal deflecting coils of the yoke 81 for the mentor beam are energized, as far as the line deflection is concerned, in exactly the opposite sense to the horizontal deflecting coils of the yokes 47, 48 and 49. For example, if the deflecting wave energy supplied and line deflection to the coils of yokes 47, 48 and 49 is building up from a minimum level to a maximum level to bring about a deflection of the beam controlled thereby in a direction from left to right, the deflecting wave energy which is supplied to provide line deflection in the yoke 81 will linearly decrease from a maximum value, for instance, at the initiation of each line traverse from the right edge of the target area 45 to a minimum value at the time the beam reaches the left-hand edge of the target area 45.

The mentor beam 79 will be blanked during its return trace portion following the completion of each line traverse or each field traverse in the same manner as is customarily provided in connection with the scanning beams 41, 42 and 43, so that it becomes immaterial, as far as the mentor beam is concerned, whether the deflecting field for the return trace is being changed from a minimum value to a maximum value, as is usually the case with the signal modulated control beams, or between a maximum value and a minimum value, as is the case with the illustrated control of the mentor beam. Accordingly, when the arrangements of the figure are functioning correctly electrically, the four beams 41, 42, 43 and 79 will trace a single raster pattern at or near dielectric 85.

No particular arrangement has herein been shown for supporting the target element 45 and its associated peripheral electrode 84 within the tube envelope, although it is to be understood that this support may be provided in such a way as to isolate the left-hand section of the tube from the right-hand section. This will prevent any defocusing of the scanning beams 41, 42 and 43 by reason of the negative potential on electrode 84, or any ineffectiveness of the position controlling charges at the edge of the target element 45. Accordingly, a seal or the like may be provided in any well-known manner. This form of construction is suggested merely by way of example for the purpose of setting forth one arrangement which has been found suitable.

Likewise, in the foregoing description, mention was made of the desirability of providing at times a key image. Such a key image may readily be provided by locating the electron gun used for developing the black and white key image in the already described manner so that equal angular separation occurs between all electron guns and all are directed toward the target 45 to impinge at approximately equal angles away from normal. The added electron gun will then impact the target area 63 so as to strike upon a coating of luminescent material suitable for bringing about a black and white image representation. The mentor beam will provide the same substantially precise registration of the key image producing beam that was above explained in connection with the separate component color image producing beams.

It will be appreciated that for reasons of simplicity, the foregoing disclosure and drawing has not made detailed reference to any suitable voltage sources for operating any of the component parts of this system, nor yet has it shown in any detail the manner in which voltage sources are utilized to bring about the development of any of the cathode ray beams. It should be understood, therefore, that such omissions as have occurred are omissions of illustration of nothing more than well-known technique rather than omissions in any essential details.

Likewise, it will be appreciated that while the invention has been particularly exemplified as applying to receiver types of tubes so as to register image producing scanning beams, the invention also applies to transmitter forms of scanning tubes for color operations and without modification or departure from what has herein been disclosed, it will be appreciated how the disclosed features of invention readily adapt themselves to the forms of transmitter scanning tubes for multicolor operations which have been disclosed by this applicant in his copending applications to which reference has been above made.

From the consideration hereinabove given to the schematic representation of this invention as set forth by the above description but mainly by the drawing, it will be seen that the various connections have been indicated by a single conductor only. This was done for reasons of simplicity. But, to indicate that there is a return path for the various applied modulating or control signals or voltages, various ground connections have been shown. It should be understood, however, that these ground connections are intended merely as conventional ways and means of representing a complete circuit rather than to indicate specifically that there is an actual physical ground at all points indicated.

Further, from what has gone before, it will be appreciated from the foregoing description that this invention has as one of its essential features that of providing for the development of a moving electrostatic charge over the target area upon which the separate individual component color images are developed and this charge is intended to move relative to the target area at a rate coinciding substantially with the separate image point production within the separate and individual component color images.

Thus, from the broad standpoint, it is wholly immaterial as to the exact manner in which this charge effect is developed. The illustration herein of the mentor beam 79 serving as the means to register the component color images is but one of certain ways of which the effect may be maintained. One further form of control which was hereinabove suggested was that of the ion stream which was usable, although difficult to control. Another form of control which might conceivably be adopted, although again subject to difficulties of operation mainly from the standpoint of complexity is that of the utilization of a great multiplicity of conductors arranged to protrude essentially from the tube and to be energized by means of a suitable distributor or electronic switch of the general type hereinabove mentioned. In another form the electronic switch might in some instances be provided by a cathode ray beam serving as a switch instrumentality of itself, as was disclosed, for instance, in applicant's U. S. Patent No. 2,302,311, granted November 17, 1942. In any event, the invention in its broadest aspects should be regarded as being one wherein the multiplicity of component color images are developed upon a viewing target area and are then, in effect, overlaid or brought into precise registry under the influence of a suitably moving and controlling electrostatic charge.

Having now described the invention, what is claimed and desired to be secured by Letters Patent is the following:

1. In a system of controlling the instantaneous impacting points of a plurality of electron beams upon a target area whereupon electro-optical images are to be initially developed, the method steps which comprise directing a first systematically moved electron beam to pass through a closed volume of dimensions which are small relative to those of the target area and containing an area on the target area, causing the said beam to trace a predetermined raster on the target so as thereby to develop upon the target a motionally progressive and systematic succession of electrostatic charges within the region of the correspondingly displaced closed volumes, tracing the target area with a plurality of additional electron beams directed thereupon from different angles with respect to the target and from the first electron beam and controlled in their motional paths so that each beam traces approximately like size homologous rasters which also approximate the raster traced upon the target area by the first beam and all of which said plurality of beams impact the target area within the instantaneous position of the small closed volume as determined by the first-mentioned beam, and thus instantaneously locating each of the last-named scanning beam impact points upon the target area in a succession of points which are determined by and coincide substantially with those target regions at which the electrostatic charges are developed by the first beam.

2. A system for registering the contemporaneous scanning operations of a plurality of cathode ray scanning beams each tracing approximately homologous and equi-dimensioned scanned image rasters upon a target area which is adapted to luminesce to produce multi-color electro-optical images which comprises means for bidirectionally deflecting each of the electron scanning beams independently so that each beam traces one of a plurality of paths on the target area which paths collectively form approximately equi-dimensioned homologous rasters, means to control each of the scanning deflections so that all of the scanning beams instantaneously and simultaneously impact approximately a like elemental area of the target, means to develop an electron mentor ray and to direct the terminating point of the said ray within a closed volume of dimensions small relative to those of the target area and which contains a point in the target area, means to bidirectionally deflect the said mentor ray relative to the target area to cause it to trace scanning paths collectively forming an image raster which approximately duplicates the rasters traced by all of the other scanning beams, means to modulate each of the first named plurality of scanning beams individually by signals representing predetermined color components of the multi-color image system so that each beam causes the development of the electro-optical image in one of its selected component colors, and means to develop an instantaneous succession and progression of electrostatic charges effective at the surface of the target area reached by the mentor beam as it traces its raster to provide a supplemental control on the terminating portions of the path of each scanning ray so as substantially precisely to bring the impacting point on the target area of all of the scanning beams instantaneously into registry within the target area whereat the mentor ray causes the said electrostatic charges to develop.

3. A system for registering the contemporaneous scanning operations of a plurality of cathode ray scanning beams each tracing approximately homologous and equi-dimensioned scanned image rasters upon a target area which is adapted to luminesce to produce multi-color electro-optical images which comprises means for bidirectionally deflecting each of the electron scanning beams independently so that each beam traces one of a plurality of paths on the target area which paths collectively form approximately equi-dimensioned homologous rasters, means to control each of the scanning deflections so that all of the scanning beams instantaneously and simultaneously impact approximately a like elemental area of the target, means to develop an electron mentor ray and to direct the terminating point of the said ray within a closed volume of dimensions small relative to those of the target area and which contains a point in the target area, means to bidirectionally deflect the said mentor ray relative to the target area to cause it to trace scanning paths collectively forming an image raster which approximately duplicates the rasters traced by all of the other scanning beams, and means to develop an instantaneous succession and progression of electrostatic charges effective at the surface of the target area reached by the mentor beam as it traces its raster to provide a supplemental control on the terminating portions of the path of each scanning ray so as substantially precisely to bring the impacting point on the target area of all of the scanning beams instantaneously into registry within the target area whereat the mentor ray causes the said electrostatic charges to develop.

4. A system for registering the scanning operations of a plurality of cathode ray scanning beams contemporaneously tracing a multiplicity of approximately like dimension homologous scanned image rasters upon a target area which comprises means for deflecting each of the electron scanning beams independently to cause each beam to trace scanning paths on the target area which collectively form substantially homologous bidimensional image rasters with each of the scanning operations so related that all of the scanning beams simultaneously impact approximately a like elemental area of the target, means to develop an electronic mentor ray and to direct the said ray to impact the target area, means to deflect the said mentor ray relative to the target area to cause it to trace a scanning path forming an image raster which approximately coincides with the raster traced by each of the other scanning beams, and means provided by the mentor beam to develop an instantaneous succession of charges effective at the target area which also effectively simulate in their sequence of positions the raster pattern and to develop at the target area an instantaneously acting potential which is effective upon the terminating portion of each scanning beam to exert a supplemental control on each scanning ray and substantially precisely register the impacting point on the target area of all of the scanning beams instantaneously and to bring each beam at all times into substantial registry with the mentor ray as it traces the selected raster.

5. A system for registering the scanning operations of a plurality of cathode ray scanning beams simultaneously tracing a multiplicity of approximately equi-dimension homologous scanned image rasters upon a target area which comprises means for deflecting each of electron scanning beams independently so that each beam traces one of a plurality of paths on the target area which paths collectively form the approximately homologous image rasters, means to control the scanning deflections so that all of the scanning beams simultaneously impact approximately a like elemental area of the target, means to develop an electronic mentor ray and to direct the said ray toward the target area, means to deflect the said mentor ray relatively to the target area to cause it to trace a series of scanning paths collectively forming an image raster which approximately coincides with the rasters traced by all of the other scanning beams, and means to develop an instantaneous succession of charges effective at the target area by the mentor beam to provide a supplemental control on the terminal portion of the path of each scanning ray so as to determine substantially precisely the impacting point on the target area of all of the scanning rays thus brought instantaneously into registry with the impact point of the mentor ray.

6. A method of controlling the instantaneous position of a plurality of electron beam impact points upon a target area which comprises directing a first systematically moved electron beam toward the target area thereby to develop upon the target a motionally progressive and systematic succession of electrostatic charges, and directing toward the target area a plurality of additional electron beams directed from different angles with respect to the target and the first electron beam and controlled in their motional paths in approximately equi-dimensional homologous rasters adjacent the target area by each of the beams and toward a succession of points which coincide substantially with those at which the electrostatic charges are developed by the first beam.

7. In a multicolor television system wherein the resultant image to be viewed is initially developed upon a luminescent target area which is arranged to be impacted by a plurality of scanning rays each reaching the target individually there to cause the development of an electro-optical image at the target area in one of a plurality of selected component colors and collectively simulating natural color, means for repeatedly tracing the target area by each of the scanning rays simultaneously along a succession of paths collectively forming approximately equi-dimensioned homologous image rasters, means for instantaneously bringing all of the scanning rays into approximate registry at each point of instantaneous beam impact, means for generating and directing an electronic mentor ray toward the target area and repeatedly deflecting the ray for causing the terminating point of the said ray thereof progressively to fall within volumetric regions of small dimensions relative to those of the complete target area, which regions each contain a point on the target area and move over a succession of paths which collectively form approximately an homologous like-dimension scanned raster, means to develop at each point of instantaneous termination of the mentor ray an electrostatic charge which progressively moves along the scanning path of the mentor ray and by the aid of which a control potential which is proportional to the charge is instantaneously developed at the target area to bring all of the scanning beams representing the component color areas into substantially precise registry at a point on the target area whereat the mentor ray is instantly developing the maximum strength electrostatic field, and means to release the developed charges subsequent to the passage of the mentor beam and prior to its rescanning of a like target region.

8. In a multicolor television system wherein the resultant image to be viewed is initially developed upon a target area which is arranged to be impacted by a plurality of scanning rays each reaching the target and individually causing the development of an electro-optical image at the target area in one of a plurality of selected component colors, means for repeatedly tracing the target area by each of the scanning rays simultaneously along a succession of paths collectively forming approximately homologous equi-dimensional image rasters, means for instantaneously bringing all of the scanning rays into approximate registry at each point of instantaneous impact, means for generating and directing an electronic mentor ray toward the target area and for causing its terminating point also repeatedly to traverse the target area in a succession of paths collectively forming approximately an homologous and like dimension concurrently scanned raster, and means to develop at each point of instantaneous impact of the mentor ray an electrostatic charge which progressively moves along the scanning path of the mentor ray and by the aid of which a control potential is instantaneously developed at the target area to bring all of the scanning beams representing the component color areas into substantially precise registry at a point on the target area within the area of effective influence of the developed electrostatic field.

9. In a system of controlling the instantaneous impacting points of a plurality of electron beams upon a target area whereupon electro-optical images are to be initially developed, the method steps which comprise directing a first systematically moved electron beam within a closed volumetric region of dimensions which are small relative to those of the complete target area and which contains a point on the target area, bi-directionally deflecting the beam relative to the target area to trace a predetermined raster on the target so as thereby to develop upon the target a motionally progressive and systematic succession of electrostatic charges within each volumetric region reached by the beam as it is deflected bi-directionally relative to the target, directing toward the target area a plurality of additional electron beams directed thereat from along different angular paths with respect to each other as related to the target area and as related to the first electron beam, and controlling the motional paths of the last named beams so that each beam normally would trace without further control a raster on the target which is approximately homologous and of like dimensions to the raster traced by the first beam relative to the target area.

10. In television apparatus, means for producing at a viewing target surface a plurality of approximately registered and homologous scanned image rasters each intended to represent the same optical image in one of its selected component colors, and means for developing electrostatic charges at the viewing target substantially coincidently with the development of the component color images so that each point of each individual component color image is brought into precise homologous registry under the control of the developed electrostatic charges.

11. A color television system comprising means to produce at a target element a plurality of individual component color approximately like size images each formed of a plurality of image points approximately registered and homologous with respect to each other, means for developing an electron beam to produce at the target plane electrostatic charges movable within the target element substantially correlatively to the motion of the image point production in the individual component color images so that corresponding developed image points of the several component color images are brought into substantially precise registry under the influence of the developed charges.

12. In a television system for producing electro-optical images in colors closely approximating an original, means for electronically producing on a target element in a point-for-point manner a plurality of individual component color images each confined within rasters of selected size, means for modifying the dimensional contours of each produced raster to bring each to approximately like size so that each image point in each individual component color image is in approximate homologous relationship with a like individual image point in each other produced component color image, and means for developing at the image target element a series of electrostatic charges movable throughout the image area in substantial correspondence to the image point production of the component color images to provide a supplemental control effect upon the image point production of each image raster of the component color images so that each component color image point is brought into substantially precise homologous registry with like image points of each other component color image.

13. In a color television system the method steps which include producing on a viewing target area a plurality of approximately registered approximately like size and homologous scanned image rasters each intended to represent the same optical image in one of its selected component colors, developing electrostatic charges at the target substantially coincidently with the development of the component color images, and then precisely registering each point of each individual component color image under the control of the developed electrostatic charges.

14. The method of producing color television images comprising producing at a target plane a plurality of individual component color approximately like size images each formed of a plurality of image points approximately registered with respect to each other, developing at the target plane electrostatic charges movable substantially correlatively to the motion of the image point production in the individual component color images, and then correcting the location at which the developed image points for each component color image appear on the target plane with said electrostatic charges so that all images have related image points in substantially precise registry under the influence of the developed charges and each produced component color image is formed as an equidimensional homologous area.

15. A method of color television which comprises producing a plurality of individual component color images at a target plane with each image having related image points approximately registered with respect to each other, developing an electron beam to produce at the target planes electrostatic charges progressively movable within the target plane substantially correlatively to the motion of the image point production in the individual component color images, and modifying the image points in each component color image raster under the influence of the charges so that like image points of all rasters are brought into substantially precise registry and each produced component color image is formed as an equidimensional homologous area.

16. In a television system for producing electro-optical images in colors closely approximating an original, the method steps which include electronically producing on a target element in a point-for-point manner a plurality of individual component color images each confined within rasters of selected size, modifying the dimensional contours of each produced component of color image raster to bring each to approximately like size so that each image point in each individual component color image is in approximate homologous relationship with a like individual image point in each other produced component color image, and then developing at the image target element a series of electrostatic charges movable throughout the target element in substantial correspondence to the image point production of the component color images to provide a supplemental control effect upon the image point production of each image raster of the component color images so that each is brought into substantially precise registry.

17. Electronic apparatus comprising a target area whereupon luminous images are developed, a plurality of electronic means each for developing a traced raster upon the target area with each related image point in each traced raster being approximately registered on the said target and each traced raster approximately homologous to the others, independent means for developing at the viewing target electrostatic charges substantially coincidentally with the development of the image points in each of the said plurality of traced rasters so that each related image point of each separate traced image raster is brought precisely into homologous registry under the influence and control of the developed electrostatic charges.

18. Electronic apparatus for developing color television images comprising a target area whereupon said images are observable, a plurality of electron guns arranged to direct individual electron beams toward the target so that the electron beam from each electron gun when deflected will trace an image raster of approximately substantially like size and of an homologous character with respect to that traced by the electron beam emanating from each other electron gun, means to modulate the electron beams emanating from the several electron guns according to different component-color video signals so that the traced raster produced by each beam shall represent the image in one component-color and so that all traced rasters additively combine to produce an image in generally patterned color, a separate electron gun for developing an electron beam to produce at the target area electrostatic charges movable with respect to the target element with the motion of the last named electron beam being substantially correlative to the motion of the image point production by each of the first-named plurality of electron beams developed from the first plurality of electron guns so that the several image points of the several independent component-color image rasters traced by the first plurality of electron beams are brought into substantially precise registry under the influence of the developed charges.

ALFRED N. GOLDSMITH.

REFERENCES CITED

The following references are of record in the file of this patent:

UNITED STATES PATENTS

| Number | Name | Date |
|---|---|---|
| 2,083,203 | Schlesinger | June 8, 1937 |
| 2,294,820 | Wilson | Sept. 1, 1942 |
| 2,312,792 | Bamford | Mar. 2, 1943 |